(12) United States Patent
Li et al.

(10) Patent No.: US 12,722,213 B2
(45) Date of Patent: Sep. 1, 2026

(54) MICRO-REINFORCED CONCENTRIC TWIST DRILL

(71) Applicants: Shandong Old Roughneck Machinery Technology Co. Ltd., Tai'an (CN); Shandong Zhiwei Machinery Co., Ltd., Xintai City (CN)

(72) Inventors: Shiqing Li, Tai'an city (CN); Aiquan Wang, Jinan city (CN); Jianhua Zhang, Jinan city (CN)

(73) Assignees: SHANDONG OLD ROUGHNECK MACHINERY TECHNOLOGY CO. LTD, Shandong (CN); SHANDONG ZHIWEI MACHINERY CO., LTD., Shandong (CN)

( * ) Notice: Subject to any disclaimer, the term of this patent is extended or adjusted under 35 U.S.C. 154(b) by 392 days.

(21) Appl. No.: 18/567,551

(22) PCT Filed: May 6, 2022

(86) PCT No.: PCT/CN2022/097191
§ 371 (c)(1),
(2) Date: Dec. 6, 2023

(87) PCT Pub. No.: WO2022/257891
PCT Pub. Date: Dec. 15, 2022

(65) Prior Publication Data

US 2024/0278336 A1 Aug. 22, 2024

(30) Foreign Application Priority Data

Jun. 6, 2021 (CN) ......................... 202110650635.6
Jun. 6, 2021 (CN) ......................... 202110651506.9

(51) Int. Cl.
*B23B 51/02* (2006.01)

(52) U.S. Cl.
CPC ........ *B23B 51/02* (2013.01); *B23B 2251/048* (2022.01); *B23B 2251/08* (2013.01);
(Continued)

(58) Field of Classification Search
CPC .............. B23B 51/02; B23B 2251/048; B23B 2251/08; B23B 2251/085; B23B 2251/14;
(Continued)

(56) References Cited

U.S. PATENT DOCUMENTS 8,215,206 B2 * 7/2012 Kozak ................. B23B 51/0081
81/53.2
9,731,358 B2 * 8/2017 Allen ................. B23B 51/0081
(Continued)

FOREIGN PATENT DOCUMENTS

CN 111730111 A 10/2020
CN 112191893 A 1/2021
(Continued)

OTHER PUBLICATIONS

International Search Report for PCT/CN2022/097191 filed on Jun. 6, 2022, with a mailing date of Sep. 8, 2022.
(Continued)

*Primary Examiner* — Ryan J. Walters
(74) *Attorney, Agent, or Firm* — Andrew Behrens; Trenam Law

(57) ABSTRACT

A micro-reinforced concentric twist drill. Concentric drilling and micro-reinforcing technologies are applied to cutting faces of the twist drill, and upright micro-reinforced center drills are symmetrically arranged on spiral cutting surfaces on two sides of an axial central area, and extend to the rear cutting surface and form drill center hole cutters in a protruding manner; a micro-reinforced central cutting face is arranged on the inner side of each micro-reinforced center drill in a protruding manner, and the micro-reinforced cen-
(Continued)

tral cutting face extends to the axial front and intersects with the rear cutting surface to form a micro-reinforced central drilling edge of the micro-reinforced concentric twist drill; and/or upright micro-reinforced reamers are symmetrically arranged on central areas of the spiral cutting surfaces on two sides of the axial center in an integral manner; a protruding reaming cutting face is formed on the inner side of each micro-reinforced reamer.

14 Claims, 3 Drawing Sheets

(52) U.S. Cl.
CPC ..... *B23B 2251/085* (2013.01); *B23B 2251/14* (2013.01); *B23B 2251/20* (2013.01); *B23B 2251/248* (2013.01); *B23B 2251/406* (2013.01); *B23B 2251/44* (2013.01); *B23B 2251/60* (2013.01)

(58) Field of Classification Search
CPC .......... B23B 2251/20; B23B 2251/248; B23B 2251/406; B23B 2251/44; B23B 2251/60
See application file for complete search history.

(56) References Cited

U.S. PATENT DOCUMENTS

2009/0317202 A1 12/2009 Zhu
2014/0369776 A1* 12/2014 Durfee .................. B23B 51/009 408/224
2023/0191507 A1* 6/2023 Li ....................... B23B 51/0002 408/230
2024/0082929 A1* 3/2024 Wang ...................... B23B 51/02

FOREIGN PATENT DOCUMENTS

CN 112191894 A * 1/2021 ............. B23B 51/06
CN 113510280 A 10/2021
CN 112453571 A 12/2021

OTHER PUBLICATIONS

Translation—International Search Report for PCT/CN2022/097191 filed on Jun. 6, 2022, with a mailing date of Sep. 8, 2022.

* cited by examiner

MICRO-REINFORCED CONCENTRIC TWIST DRILL

CROSS-REFERENCE TO RELATED APPLICATION

This patent application is a national stage application of International Patent Application No. PCT/CN2022/097191, filed on Jun. 6, 2022, which claims the benefit and priority of Chinese Patent Application No. 202110650635.6 filed on Jun. 6, 2021, and priority of Chinese Patent Application No. 202110651506.9 filed on Jun. 6, 2021 the disclosures of which are incorporated by reference herein in their entireties.

TECHNICAL FIELD

The present disclosure relates to a micro-reinforced concentric twist drill, which is used in the drilling and sharpening process of machining and maintenance by bench workers. All screw-connected parts of mechanical products need to be drilled. The current machining materials are generally of high hardness and viscosity, and the requirements for twist drills are getting higher and higher, requiring twist drills with high strength, high efficiency and long service life.

BACKGROUND

At present, the drilling tool used in machining is composed of a chisel edge, a cutting edge, a spiral cutting edge and a side edge. The cutting edge is located on a spiral cutting surface and is of a single co-located cutting structure. The cutting edge is in the centrifugal force transmission range of rotary cutting. The cutting edge is subjected to both the rotary cutting force and the centrally outward transmission force. The edge at the intersection of the cutting edge and the spiral cutting edge is always easy to be damaged under the action of both forces. An existing hole machining tool swings due to the fact that the structure is not absolutely balanced during drilling. The spiral cutting surface and the spiral cutting edge are damaged due to the fact that the tool is stabilized only through the spiral cutting surface. It is widely recognized that the smoother the surface, the higher the strength. According to new theories, the strength of the surface with small gaps is higher, so that the existing hole machining tool is low in efficiency, easy to be damaged, poor in stability and low in drilling accuracy.

SUMMARY

The present disclosure is a new product developed in view of the above problems, so as to provide a micro-reinforced concentric twist drill. The outer cutter has the function of blocking force transmission, good stability, high efficiency, ultra-low resistance, high strength and long service life, and is easy to be located during drilling and has high drilling accuracy. It is generally recognized that the smoother the surface, the higher the strength. According to new theories in recent years, the strength of the surface with small gaps is higher. Experiments show that the millimeter scale has the most obvious high strength characteristic, that is, millimeter strength, on cutting tools in a normal physical state. The present disclosure relates to the application of micro-reinforced and concentric drilling technology on twist drills.

To achieve the objective above, the technical solution proposed by the present disclosure is as follows:

A micro-reinforced concentric twist drill, relating to a drilling tool for machining, includes a tool shank, and a tool head. At least two spiral strips are formed on the tool head. For each spiral strip, a surface, facing a cutting direction, of the spiral strip is formed as a spiral cutting surface, a surface extending backwards along an outer edge of the spiral cutting surface is a spiral pair cutting surface, the spiral cutting surface intersects with the spiral pair cutting surface to form a spiral cutting edge, and a surface on a back side of an axial front end of the spiral strip is formed as a rear cutting surface. At least the rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge.

The present disclosure relates to the application of a symmetric concentric drill technology and a micro-reinforcement technology on a common twist drill.

On both sides of a region of an axial center of the micro-reinforced concentric twist drill, protruding micro-reinforced center drills are symmetrically arranged on the spiral cutting surfaces, and each micro-reinforced center drill extends to the rear cutting surface and protrudes to form a center drilling tool. A protruding micro-reinforced central cutting surface is formed on an inner side of each micro-reinforced center drill, and each micro-reinforced central cutting surface extends axially forward to intersect with the rear cutting surface to form a micro-reinforced center hole drilling edge of the micro-reinforced concentric twist drill.

On both sides of the axial center, protruding micro-reinforced reamers are integrally and symmetrically arranged at center areas of the spiral cutting surfaces. A reaming cutting surface protrudes from an inner side of each micro-reinforced reamer, and each reaming cutting surface extends forward to intersect with the rear cutting surface to form a reaming cutting edge.

A micro-reinforced concentric twist drill, relating to a drilling tool for machining, includes a tool shank, and a tool head. At least two spiral strips are integrally formed on the tool head. For each spiral strip, a surface, facing a cutting direction, of the spiral strip is formed as a spiral cutting surface, a surface extending backward along an outer edge of the spiral cutting surface is formed as a spiral pair cutting surface, the spiral cutting surface intersects with the spiral pair cutting surface to form a spiral cutting edge, and a surface on a back side of an axial front end of the spiral strip is formed as a rear cutting surface. At least the rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge.

The present disclosure relates to the application of a symmetric concentric drill technology and the micro-reinforcement technology of sharp spiral cutting edge on a common twist drill.

On both sides of a region of an axial center of the micro-reinforced concentric twist drill, protruding micro-reinforced center drills are symmetrically arranged on the spiral cutting surfaces, and each micro-reinforced center drill extends to the rear cutting surface and protrudes to form a center drilling tool. A micro-reinforced central cutting surface in millimeters protrudes from an inner side of the micro-reinforced center drill, and each micro-reinforced central cutting surface extends axially forward to intersect with the rear cutting surface to form a micro-reinforced center hole drilling edge of the micro-reinforced concentric twist drill.

On both sides of the micro-reinforced concentric twist drill, micro-reinforced wear-resistant grooves recessed along a direction from the spiral cutting edges inward to the axial center are integrally formed on the spiral cutting surfaces. A micro-reinforced wear-resistant cutting surface with millimeter strength is formed at a bottom of each micro-reinforced wear-resistant groove along the spiral cutting edge, and a protruding micro-reinforced wear-resistant table is arranged on an inner side of each micro-reinforced wear-resistant cutting surface. Each micro-reinforced wear-resistant cutting surface extends forward to intersect with the rear cutting surface to form a micro-reinforced wear-resistant cutting edge.

A micro-reinforced concentric twist drill, relating to a drilling tool for machining, includes a tool shank, and a tool head. At least two spiral strips B are integrally formed on the tool head. For each spiral strip, a surface, facing a cutting direction, of each spiral strip is formed as a spiral cutting surface, a surface extending backward along an outer edge of the spiral cutting surface is formed as a spiral pair cutting surface, the spiral cutting surface intersects with the spiral pair cutting surface to form a spiral cutting edge, and a surface on a top side of an axial front end of the spiral strip is formed as a rear cutting surface. At least the rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge.

The present disclosure relates to the application of a symmetric concentric drill technology and a micro-reinforcement technology of sharp high-strength spiral cutting edges on a common twist drill.

On both sides of the micro-reinforced concentric twist drill, protruding micro-reinforced reamers are symmetrically arranged at center areas of the spiral cutting surfaces spirally extending along the direction towards the axial center. A reaming cutting surface protrudes from an inner side of each micro-reinforced reamer, and each reaming cutting surface extends forward to intersect with the rear cutting surface to form a reaming cutting edge.

Micro-reinforced wear-resistant grooves recessed along a direction from the spiral cutting edges inward to the axial center are integrally formed on the spiral cutting surfaces. A micro-reinforced wear-resistant cutting surface with millimeter strength is formed at a bottom of each micro-reinforced wear-resistant groove along each spiral cutting edge, and a protruding micro-reinforced wear-resistant table is arranged on an inner side of the micro-reinforced wear-resistant cutting surface. Each micro-reinforced wear-resistant table extends forward to intersect with the rear cutting surface to form a micro-reinforced wear-resistant drill, and each micro-reinforced wear-resistant cutting surface extends forward to intersect with the rear cutting surface to form a micro-reinforced wear-resistant cutting edge.

A micro-reinforced concentric twist drill, relating to a drilling tool for machining, includes a tool shank, and a tool head. At least two spiral strips are integrally formed on the tool head. For each spiral strip, a surface, facing a cutting direction, of the spiral strip is formed as a spiral cutting surface, a surface extending backward along an outer edge of the spiral cutting surface is formed as a spiral pair cutting surface, the spiral cutting surface intersects with the spiral pair cutting surface to form a spiral cutting edge, and a surface on a top side of an axial front end of the spiral strip is formed as a rear cutting surface. At least the rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge The present disclosure relates to the application of a symmetric concentric drill technology and a micro-reinforcement technology of sharp high-strength spiral cutting edges on a common twist drill.

On both sides of a region of an axial center of the micro-reinforced concentric twist drill, protruding micro-reinforced center drills are symmetrically arranged on the spiral cutting surfaces, and each micro-reinforced center drill extends to the rear cutting surfaces and protrudes to form a center drilling tool. A micro-reinforced central cutting surfaces are protrudes from an inner side of the micro-reinforced center drill, and each micro-reinforced central cutting surface extends axially forward to intersect with the rear cutting surface to form a micro-reinforced center hole drilling edge of the micro-reinforced concentric twist drill.

On both sides of the axial center, protruding micro-reinforced reamers are integrally and symmetrically arranged at center areas of the spiral cutting surfaces. A reaming cutting surface protrudes from an inner side of each micro-reinforced reamer, and each reaming cutting surface extends forward to intersect with the rear cutting surface to form a reaming cutting edge Micro-reinforced wear-resistant grooves recessed along a direction from the spiral cutting edges inward to the axial center are integrally formed on the spiral cutting surfaces. A micro-reinforced wear-resistant cutting surface with millimeter strength is formed at a bottom of each micro-reinforced wear-resistant groove along each spiral cutting edge, and a protruding micro-reinforced wear-resistant table is arranged on an inner side of the micro-reinforced wear-resistant cutting surface. Each micro-reinforced wear-resistant table extends forward to intersect with the rear cutting surface to form a micro-reinforced wear-resistant drill, and each micro-reinforced wear-resistant cutting surface extends forward to intersect with the rear cutting surface to form a micro-reinforced wear-resistant cutting edge.

Preferably, an included angle between the micro-reinforced wear-resistant cutting surface and the spiral pair cutting surface is less than an included angle between the spiral cutting surface and the spiral pair cutting surface.

Preferably, an included angle between the micro-reinforced wear-resistant cutting edge and the spiral pair cutting surface is less than or equal to an included angle between the spiral cutting surface and the spiral pair cutting surface.

Preferably, the rear cutting surfaces on both sides of the micro-reinforced concentric twist drill intersect at the axial center to form a chisel edge, and a chamfered surface and a shortened chisel edge are formed on both sides of the chisel edge of the micro-reinforced concentric twist drill by chamfering; or A chamfered surface and a sharp edge without a chisel edge are formed on both sides of the chisel edge of the micro-reinforced concentric twist drill form.

Preferably, cooling holes are formed in the spiral strips of the tool shank and the tool head of the micro-reinforced concentric twist drill.

Preferably, one or more steps from a central chisel edge in such a way that a height of the rear cutting surface in a direction of an outer side edge is reduced are formed on the micro-reinforced concentric twist drill.

Preferably, one or more notch edges are formed on the cutting edge of the micro-reinforced concentric twist drill.

Preferably, one or more notch edges extend to the rear cutting surface to form one or more grooves.

Preferably, the micro-reinforced concentric center drills and the micro-reinforced concentric center cutting surfaces are symmetrically arranged on the spiral cutting surfaces on both sides of the axial center of the micro-reinforced concentric twist drill. Each micro-reinforced concentric center cutting surface extends to an axial front end along the spiral cutting surface to intersect with the rear cutting surface to form a center hole concentric cutting edge.

Preferably, the protruding micro-reinforced concentric reamers and the protruding concentric reaming cutting surfaces are symmetrically arranged on the spiral cutting surfaces on both sides of the micro-reinforced concentric twist drill, respectively. Each concentric reaming cutting surface extends to an axial front end along the spiral cutting surface to intersect with the rear cutting surface to form a concentric reaming cutting edge.

Preferably, the micro-reinforced concentric wear-resistant grooves recessed along the spiral cutting edges are symmetrically formed on the spiral cutting surfaces on both sides of the axial center of the micro-reinforced concentric twist drill.

A micro-reinforced concentric wear-resistant table and a micro-reinforced concentric wear-resistant cutting surface are arranged in each micro-reinforced concentric wear-resistant groove of the micro-reinforced concentric twist drill. Each micro-reinforced concentric wear-resistant cutting surface extends to an axial front end along each spiral cutting surface to intersect with the rear cutting surface to form a micro-reinforced concentric wear-resistant cutting edge.

Preferably, the micro-reinforced center drills and the micro-reinforced concentric central cutting surfaces are symmetrically arranged on the spiral cutting surfaces on both sides of the axial center of the micro-reinforced concentric twist drill.

Preferably, Each micro-reinforced concentric central cutting surface of the micro-reinforced concentric twist drill extends to the axial front end along the spiral cutting surface to intersect with the rear cutting surface to form a center hole drilling edge.

Preferably, the micro-reinforced concentric drills and the micro-reinforced concentric cutting surfaces are symmetrically arranged on the spiral cutting surfaces on both sides of the axial center of the micro-reinforced concentric twist drill. Each micro-reinforced concentric cutting surface extends to an axial front end along the spiral cutting surface to intersect with the rear cutting surface to form a center hole drilling edge.

Preferably, each micro-reinforced concentric twist drill protrudes from the region of the axial center of the micro-reinforced concentric twist drill to form a protruding center drilling tool.

Preferably, a height from the micro-reinforced concentric cutting surface of the micro-reinforced center drill at the micro-reinforced concentric twist to the spiral cutting surface is less than or equal to one-tenth of a diameter of the micro-reinforced concentric twist drill.

Preferably, the micro-reinforced center drills or the micro-reinforced concentric drills have the effects of reducing the resistance and increasing efficiency.

Preferably, the protruding the micro-reinforced concentric reamers and the protruding concentric reaming cutting surfaces are symmetrically arranged at the center areas of the spiral cutting surfaces along the direction towards the axial center of the micro-reinforced concentric twist drill.

Preferably, each reaming cutting surface of the micro-reinforced concentric twist drill extends to the axial front end along the spiral cutting surface to intersect with the rear cutting surface to form a reaming cutting edge.

Preferably, the protruding micro-reinforced concentric reamers and the protruding concentric reaming cutting surfaces are symmetrically arranged at the center areas of the spiral cutting surfaces along the direction towards the axial center of the micro-reinforced concentric twist drill. Each concentric reaming cutting surface extends to the axial front end along the spiral cutting surface to intersect with the rear cutting surface to form a concentric reaming cutting edge.

Preferably, a height from the micro-reinforced reamer of the micro-reinforced concentric twist drill to the spiral cutting surface is less than or equal to one-tenth of the diameter of the micro-reinforced concentric twist drill.

Preferably, the micro-reinforced reamers or the micro-reinforced concentric reamers have the effects of balancing and stabilizing.

Preferably, micro-reinforced wear-resistant grooves recessed along the spiral cutting edges are symmetrically formed on the spiral cutting surfaces on both sides of the axial center of the micro-reinforced concentric twist drill.

Preferably, a micro-reinforced wear-resistant table and a micro-reinforced wear-resistant cutting surface are arranged in the micro-reinforced wear-resistant groove.

Preferably, each micro-reinforced wear-resistant cutting surface of the micro-reinforced concentric twist drill extends to the axial front end along the spiral cutting surface to intersect with the rear cutting surface to form a micro-reinforced wear-resistant cutting edge.

Preferably, an included angle between the micro-reinforced wear-resistant cutting surface of the micro-reinforced concentric twist drill and the spiral pair cutting surface is less than or equal to an included angle between the spiral cutting surface and the spiral pair cutting surface.

Preferably, an included angle between the micro-reinforced wear-resistant cutting surface of the micro-reinforced concentric twist drill and the spiral pair cutting surface is less than an included angle between the spiral cutting surface and the spiral pair cutting surface.

Preferably, an included angle between the micro-reinforced concentric wear-resistant cutting surface of the micro-reinforced concentric twist drill and the spiral pair cutting surface is equal to an included angle between the spiral cutting surface and the spiral pair cutting surface.

Preferably, each micro-reinforced concentric wear-resistant cutting surface of the micro-reinforced concentric twist drill extends to the axial front end along the spiral cutting surface to intersect with the rear cutting surface to form a micro-reinforced concentric wear-resistant cutting edge.

Preferably, micro-reinforced concentric wear-resistant recessed concave along the spiral cutting edges are symmetrically formed on the spiral cutting surfaces on both sides of the axial center of the micro-reinforced concentric twist drill.

A micro-reinforced concentric wear-resistant table and a micro-reinforced concentric wear-resistant cutting surface are arranged in each micro-reinforced concentric wear-resistant groove of the micro-reinforced concentric twist drill.

Preferably, each micro-reinforced concentric wear-resistant cutting surface of the micro-reinforced concentric twist drill extends to the axial front end along the spiral cutting surface to intersect with the rear cutting surface to form a micro-reinforced concentric wear-resistant cutting edge.

Preferably, a height of the micro-reinforced concentric wear-resistant table of the micro-reinforced concentric twist drill is less than or equal to 1 mm.

Preferably, a width of the micro-reinforced wear-resistant cutting surface of the micro-reinforced concentric twist drill is less than or equal to one-sixth of the diameter of the micro-reinforced concentric twist drill.

Preferably, the reduction of an included angle between the micro-reinforced wear-resistant cutting surface and the spiral pair cutting surface of the micro-reinforced concentric twist drill is beneficial to increase the cutting efficiency of the micro-reinforced concentric twist drill.

Preferably, the micro-reinforced wear-resistant grooves or the micro-reinforced concentric wear-resistant grooves have the effect of prolonging the service life.

Preferably, each micro-reinforced center drill of the micro-reinforced concentric twist drill extends to a front end to intersect with the rear cutting surface to form a micro-reinforced side edge.

Preferably, each micro-reinforced reamer of the micro-reinforced concentric twist drill extends forward to intersect with the rear cutting surface to form the micro-reinforced side edge.

Preferably, each micro-reinforced wear-resistant table of the micro-reinforced concentric twist drill extends forward to intersect with the rear cutting surface to form the micro-reinforced side edge.

Preferably, the rear cutting surfaces on both sides of the micro-reinforced concentric twist drill intersect at the axial center to form a chisel edge, and a chamfered surface and a shortened chisel edge are formed on both sides of the chisel edge of the micro-reinforced concentric twist drill by chamfering; or a chamfered surface and a sharp edge without a chisel edge are formed on both sides of the chisel edge of the micro-reinforced concentric twist drill.

Preferably, cooling holes are formed in the spiral strips of the tool shank and the tool head of the micro-reinforced concentric twist drill.

Preferably, one or more steps are formed on the micro-reinforced concentric twist drill in a manner of a height of the rear cutting surface is reduced in a direction from a central chisel edge to an outer side edge.

Preferably, one or more notch edges are formed on the cutting edge of the micro-reinforced concentric twist drill.

The one or more notch edges extend to the rear cutting surface to form one or more grooves.

Preferably, an included angle between the cutting edge at the outermost side of the micro-reinforced concentric twist drill and the spiral pair cutting edge is an acute angle, a straight angle, or an obtuse angle.

Preferably, at least one group of protruding structures on the spiral cutting surfaces on both sides of the axial center of the micro-reinforced concentric twist drill are symmetric and within a tolerance range.

The present disclosure has the beneficial effects that:

In the contrast experiment carried out on a drilling machine, a twist drill with a diameter of 20 mm was used for the experiment, which is also made of M35 cobalt-containing high-speed steel, heat treated and produced in the same batch. A drilling object is a forged and tempered gear finish turning workpiece, a drilling depth is 35 mm, and blind holes are formed. In the case that the rotating speed and the feed amount of the twist drill with a common structure reach the limit, the rotating speed of the micro-reinforced concentric twist drill can be increased by 40%, the feed amount is improved by 40%, and the comprehensive drilling efficiency is increased by 0.96 times. The number of holes drilled by the micro-reinforced concentric twist drill according to the embodiments of the present disclosure is ten to thirty times more than that of a twist drill with a common structure.

BRIEF DESCRIPTION OF THE DRAWINGS

The technical solutions and advantages of the present disclosure are described in detail with reference to the accompanying drawings. In the drawings.

DETAILED DESCRIPTION OF THE EMBODIMENTS

The preferred embodiments of the micro-reinforced concentric twist drill of the present disclosure are described in detail below with reference to the accompanying drawings. In first to seventh embodiments, a tool with two spiral strips is used as an example for illustration.

First Embodiment

Figures 1, 2:
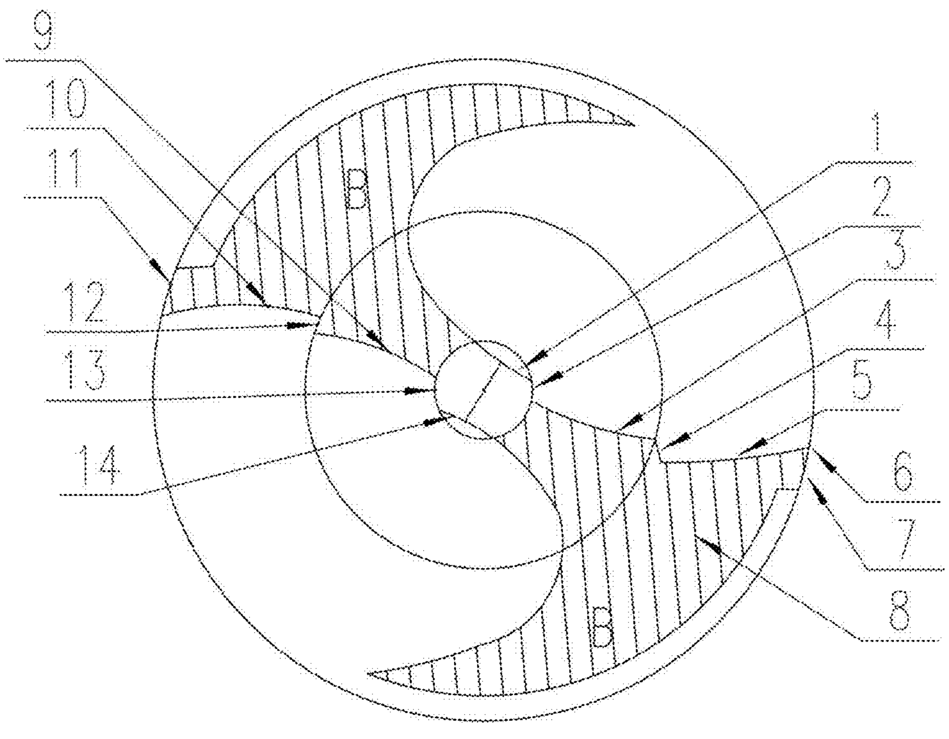
FIG. 1 is a schematic diagram of a top view section of a micro-reinforced concentric twist drill according to the first, fifth and sixth embodiments of the present disclosure.
FIG. 2 is a schematic diagram of a top view section of a micro-reinforced concentric twist drill according to the second, fifth and seventh embodiments of the present disclosure.
Figure 5:
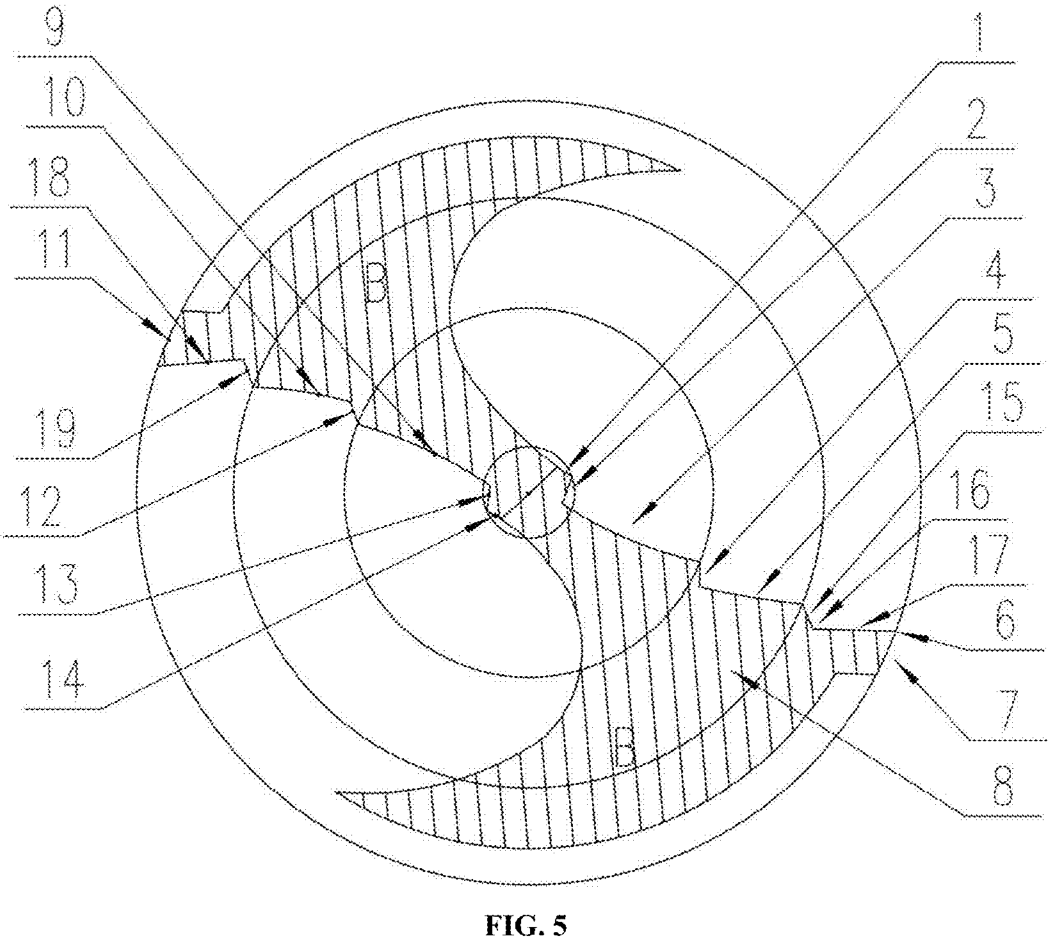
FIG. 5 is a schematic diagram of a top view section of a micro-reinforced concentric twist drill according to the fourth, fifth, sixth and seventh embodiments of the present disclosure.

As shown in FIGS. 1 and 5, a micro-reinforced concentric twist drill according to a first embodiment of the present disclosure relates to a drilling tool for machining, including a tool shank (not shown) and a tool head. At least two spiral strips B are integrally formed on the tool head. A surface, facing a cutting direction, of each spiral strip B is formed as a spiral cutting surface 3, a surface extending backward along an outer edge of the spiral cutting surface 3 is formed as a spiral pair cutting surface 5, the spiral cutting surface 3 intersects with the spiral pair cutting surface 5 to form a spiral cutting edge 6, and a surface on a back side of an axial front end of the spiral cutting surface 3 is formed as a rear cutting surface 8. At least the rear cutting surfaces on both sides intersect to form a chisel edge A. The spiral cutting surface 3 intersects with the rear cutting surface 8 to form a cutting edge 11, and the spiral pair cutting surface 5 intersects with the rear cutting surface 8 to form a side edge 10.

The present disclosure relates to the arrangement of a symmetric concentric drill technology and a micro-reinforcement technology on a common twist drill.

On both sides of a region of an axial center O of the micro-reinforced concentric twist drill, protruding micro-reinforced center drills 2 are symmetrically arranged on the spiral cutting surfaces 3, and each micro-reinforced center drill 2 protrudes from the region of the axial center of the micro-reinforced concentric twist drill to form a protruding center drilling tool. A micro-reinforced central cutting surface 1 in millimeters protrudes from an inner side of each micro-reinforced center drill, and each micro-reinforced central cutting surface 1 extends axially forward to intersect with the rear cutting surface to form a micro-reinforced center hole drilling edge 14 of the micro-reinforced concentric twist drill.

On both sides of the micro-reinforced concentric twist drill, protruding micro-reinforced reamers 12 are integrally and symmetrically arranged at center areas of the spiral cutting surfaces 3 spirally extending along the direction towards the axial center O. A reaming cutting surface 11 protrudes from an inner side of each micro-reinforced reamer 4, and the reaming cutting surface 11 extends forward to intersect with the rear cutting surface 8 to form a reaming cutting edge 9.

The micro-reinforced concentric center drills 13 and the micro-reinforced concentric central cutting surfaces 1 are symmetrically arranged on the spiral cutting surfaces 3 on both sides of the axial center of the micro-reinforced concentric twist drill, respectively.

Each micro-reinforced concentric central cutting surface 1 of the micro-reinforced concentric twist drill extends to an axial front end along the spiral cutting surface to intersect with the rear cutting surface 8 to form a center hole cutting edge 14.

The micro-reinforced concentric twist drill protrudes from the region of the axial center thereof to form a protruding center drilling tool.

A height from the micro-reinforced concentric central cutting surface 1 of the micro-reinforced center drill of the micro-reinforced concentric twist drill to the spiral cutting surface 3 is less than or equal to one-tenth of a diameter of the micro-reinforced concentric twist drill.

The micro-reinforced center drills 2 or the micro-reinforced concentric center drills 2 have the effects of reducing the resistance and increasing the efficiency.

The protruding micro-reinforced concentric reamers 4 and the protruding concentric reaming cutting surfaces 11 are symmetrically arranged at the center areas of the spiral cutting surfaces 3 along the direction towards the axial center of the micro-reinforced concentric twist drill.

Preferably, each micro-reinforced center drill 2 of the micro-reinforced concentric twist drill extends to a front end to intersect with the rear cutting surface to form a micro-reinforced side edge 10.

Preferably, each micro-reinforced reamer of the micro-reinforced concentric twist drill extends forward to intersect with the rear cutting surface to form the micro-reinforced side edge 10.

Preferably, the rear cutting surfaces 8 on both sides of the micro-reinforced concentric twist drill intersect at the axial center O to form a chisel edge A, and a chamfered surface and a shortened chisel edge A are formed on both sides of the chisel edge A of the micro-reinforced concentric twist drill by chamfering; or a chamfered surface and a sharp edge O without a chisel edge A are formed on both sides of the chisel edge A of the micro-reinforced concentric twist drill.

Each concentric reaming cutting surface 11 of the micro-reinforced concentric twist drill extends to the axial front end along the spiral cutting surface 3 to intersect with the rear cutting surface 8 to form a reaming cutting edge 9.

A height from the micro-reinforced concentric reamer 4 of the micro-reinforced concentric twist drill to the spiral cutting surface is less than or equal to one-tenth of the diameter of the micro-reinforced concentric twist drill.

The micro-reinforced reamers or the micro-reinforced concentric reamers 4 have the effects of balancing and stabilizing.

As the micro-reinforced center drills 2 and the micro-reinforced central cutting surfaces 1 protruding from the inner side are symmetrically arranged on the spiral cutting surfaces 3 on both sides of the axial center, and a micro-reinforced wear-resistant table 15 and a micro-reinforced wear-resistant cutting surface 17 are formed in a micro-reinforced wear-resistant groove 16, the stability of the micro-reinforced concentric twist drill is effectively maintained, and the wear of the cutting edges of the micro-reinforced concentric twist drill is reduced, which is beneficial to continuously maintain the sharpness of the cutting edges of the tool and increase the cutting efficiency.

In the contrast experiment carried out on a drilling machine, a micro-reinforced concentric twist drill with a diameter of 10.5 mm was used for the experiment, which was also made of M35 cobalt-containing high-speed steel, heat treated and produced in the same batch. A drilling object is a forged and tempered gear finish turning workpiece, a drilling depth is 35 mm, and blind holes are formed. A width of the spiral branch hole cutting surface 3 of the micro-reinforced concentric twist drill is 2.5 mm, and a height of a spiral branch hole table 23 is 0.8 mm. In the case that the rotating speed and the feed amount of the micro-reinforced concentric twist drill with a common structure reach the limit, the rotating speed of the micro-reinforced concentric twist drill can be increased by 40%, the feed amount is increased by 40%, and the comprehensive drilling efficiency is increased by 0.96 times. 312 holes can be drilled by the micro-reinforced concentric twist drill with a common structure, and 4376 holes can be drilled by the micro-reinforced concentric twist drill according to the embodiment of the present disclosure. The number of holes drilled by the micro-reinforced concentric twist drill according to the embodiment of the present disclosure is fourteen times more than that drilled by the micro-reinforced concentric twist drill with a common structure.

Second Embodiment

A micro-reinforced concentric twist drill according to a second embodiment of the present disclosure is shown in FIG. 2 and FIG. 5, which is comprehensively applied on the basis of the first embodiment, and mainly relates to a drilling tool for machining. The micro-reinforced concentric twist drill includes a tool shank (not shown) and a tool head. At least two spiral strips B are integrally formed on the tool head. A surface, facing a cutting direction, of each spiral strip B is formed as a spiral cutting surface 3, a surface extending backward along an outer edge of the spiral cutting surface 3 is formed as a spiral pair cutting surface 5, the spiral cutting surface 3 intersects with the spiral pair cutting surface 5 to form a spiral cutting edge 6, and a surface on a back side of an axial front end of the spiral cutting surface 3 is formed as a rear cutting surface 8. At least the rear cutting surfaces on both sides intersect to form a chisel edge A, the spiral cutting surface 3 intersects with the rear cutting surface 8 to form a cutting edge 11, and the spiral pair cutting surface 5 intersects with the rear cutting surface 8 to form a side edge 10.

The present disclosure relates to the arrangement of a symmetric concentric drill technology and a micro-reinforcement technology of sharp high-strength spiral cutting edges on a common twist drill.

Protruding micro-reinforced center drills 2 are symmetrically arranged on the spiral cutting surfaces 3 on both sides of a region of an axial center O of the micro-reinforced concentric twist drill, and each micro-reinforced center drill 2 protrudes from the region of the axial center of the micro-reinforced concentric twist drill to form a protruding side edge 10 of the center drilling tool 13. A micro-reinforced central cutting surface 1 in millimeters protrudes from an inner side of each micro-reinforced center drill, and each micro-reinforced central cutting surface 1 extends axially forward to intersect with the rear cutting surface to form a micro-reinforced center hole drilling edge 14 of the micro-reinforced concentric twist drill.

On both sides of the micro-reinforced concentric twist drill, micro-reinforced wear-resistant grooves 16 recessed along the direction from the spiral cutting edges 6 inward to the axial center O are integrally formed on the spiral cutting surfaces 3. A micro-reinforced wear-resistant cutting surface 17 with millimeter strength is formed at a bottom of each micro-reinforced wear-resistant groove 16 along the spiral cutting edge 6, and a protruding micro-reinforced wear-resistant table 15 is arranged on an inner side of the micro-reinforced wear-resistant cutting surface 17. The micro-reinforced wear-resistant cutting surface 17 extends forward to intersect with the rear cutting surface 8 to form a micro-reinforced wear-resistant cutting edge 18.

Micro-reinforced concentric center drills 2 and micro-reinforced concentric central cutting surfaces 1 are symmetrically arranged on the spiral cutting surfaces 3 on both sides of the axial center of the micro-reinforced concentric twist drill, respectively.

Each micro-reinforced concentric central cutting surface 1 of the micro-reinforced concentric twist drill extends to an axial front end along the spiral cutting surface to intersect with the rear cutting surface 8 to form a center hole cutting edge 14.

A height from the micro-reinforced concentric central cutting surface 1 of the micro-reinforced center drill 2 of the micro-reinforced concentric twist drill to the spiral cutting surface 3 is less than or equal to one-tenth of a diameter of the micro-reinforced concentric twist drill.

The micro-reinforced center drills 2 or the micro-reinforced concentric wear-resistant grooves 16 have the effects of reducing the resistance and increasing the efficiency.

The each micro-reinforced wear-resistant table 15 of the micro-reinforced concentric twist drill extends forward to intersect with the rear cutting surface to form the micro-reinforced side edge 19.

The micro-reinforced concentric wear-resistant grooves 16 recessed along the spiral cutting edge 6 are symmetrically formed on the spiral cutting surfaces 3 on both sides of the axial center of the micro-reinforced concentric twist drill.

A micro-reinforced concentric wear-resistant table 15 and a micro-reinforced concentric wear-resistant cutting surface 17 are arranged in the micro-reinforced wear-resistant groove 16 of the micro-reinforced concentric twist drill.

An included angle $\alpha 2$ between the micro-reinforced wear-resistant cutting surface 17 of the micro-reinforced concentric twist drill and the spiral pair cutting surface 5 is equal to an included angle $\alpha 1$ between the spiral cutting surface 3 and the spiral pair cutting surface 5.

An included angle $\alpha 2$ between the micro-reinforced wear-resistant cutting surface 17 of the micro-reinforced concentric twist drill and the spiral pair cutting surface 5 is less than an included angle $\alpha 1$ between the spiral cutting surface 3 and the spiral pair cutting surface 5.

The micro-reinforced concentric cutting surface 17 of the micro-reinforced concentric twist drill extends to the axial front end along the spiral cutting surface 3 to intersect with the rear cutting surface 8 to form a micro-reinforced concentric wear-resistant cutting edge 18.

The micro-reinforced wear-resistant grooves 16 or the micro-reinforced concentric wear-resistant grooves 16 have the effect of prolonging the service life.

The micro-reinforced wear-resistant cutting surfaces 17 are symmetrically arranged on the spiral cutting surfaces 3 on both sides of the axial center of the micro-reinforced concentric twist drill.

A height of the micro-reinforced concentric wear-resistant table 15 of the micro-reinforced concentric twist drill is less than or equal to 1 mm.

A width of the micro-reinforced wear-resistant cutting surface 17 of the micro-reinforced concentric twist drill is less than or equal to one-sixth of a diameter of the micro-reinforced concentric twist drill.

Through the above arrangement, a process hole is formed first and then drilled during the drilling process. As the arrangement on the same tool has high stability, compared with the common reamers, the micro-reinforced concentric twist drill has the advantages of high stability, high efficiency and higher drilling accuracy.

As the included angle $\alpha 2$ between the micro-reinforced wear-resistant cutting surface 17 of the micro-reinforced concentric twist drill and the spiral pair cutting surface 5 is less than an included angle $\alpha 1$ between the spiral cutting surface 5 and the spiral pair cutting surface 5, the micro-reinforced concentric twist drill provided with the micro-reinforced wear-resistant grooves 16 or the micro-reinforced concentric wear-resistant grooves 16 has small resistance and high cutting efficiency.

As the symmetrical micro-reinforced center drills 2 and the micro-reinforced central cutting surfaces 1 protruding from the inner side are arranged on the spiral cutting surfaces 3 on both sides of the axial center, and a micro-reinforced wear-resistant table 15 and a micro-reinforced wear-resistant cutting surface 17 are arranged in a micro-reinforced wear-resistant groove 16, the stability of the micro-reinforced concentric twist drill is effectively maintained, and the wear of the cutting edges of the micro-reinforced concentric twist drill is reduced, which is beneficial to continuously maintain the sharpness of the cutting edges of the tool and increase the cutting efficiency.

In the contrast experiment carried out on a drilling machine, a micro-reinforced concentric twist drill with a diameter of 10.0 mm was used for the experiment, which was also made of M35 cobalt-containing high-speed steel, heat treated and produced in the same batch are carried out on at the same time. A drilling object is a forged and tempered gear finish turning workpiece, a drilling depth is 35 mm, and blind holes are formed. A width of the spiral cutting surface 3 of the micro-reinforced concentric twist drill is 3.5 mm, and a height of the spiral step center table 10 is 0.6 mm. In the case that the rotating speed and the feed amount of the micro-reinforced concentric twist drill with a common structure reach the limit, the rotating speed of the micro-reinforced concentric twist drill can be increased by 40%, the feed amount is increased by 40%, and the comprehensive drilling efficiency is increased by 0.96 times. 312 holes can be drilled by the micro-reinforced concentric twist drill with a common structure, and 3798 holes can be drilled by the micro-reinforced concentric twist drill according to the embodiment of the present disclosure. The number of holes drilled by the micro-reinforced concentric twist drill according to the embodiment of the present disclosure is twelve times more than that drilled by the micro-reinforced concentric twist drill with a common structure.

According to the above experimental results, the micro-reinforced concentric twist drill is high in use efficiency, but its service life is obviously not as good as that with a reaming cutting surface 1 and a micro-reinforced reamer 4 on the outside. However, this structure still has the effects of prolonging the service life and increasing the efficiency compared with the common micro-reinforced concentric twist drill.

Third Embodiment

Figure 4:
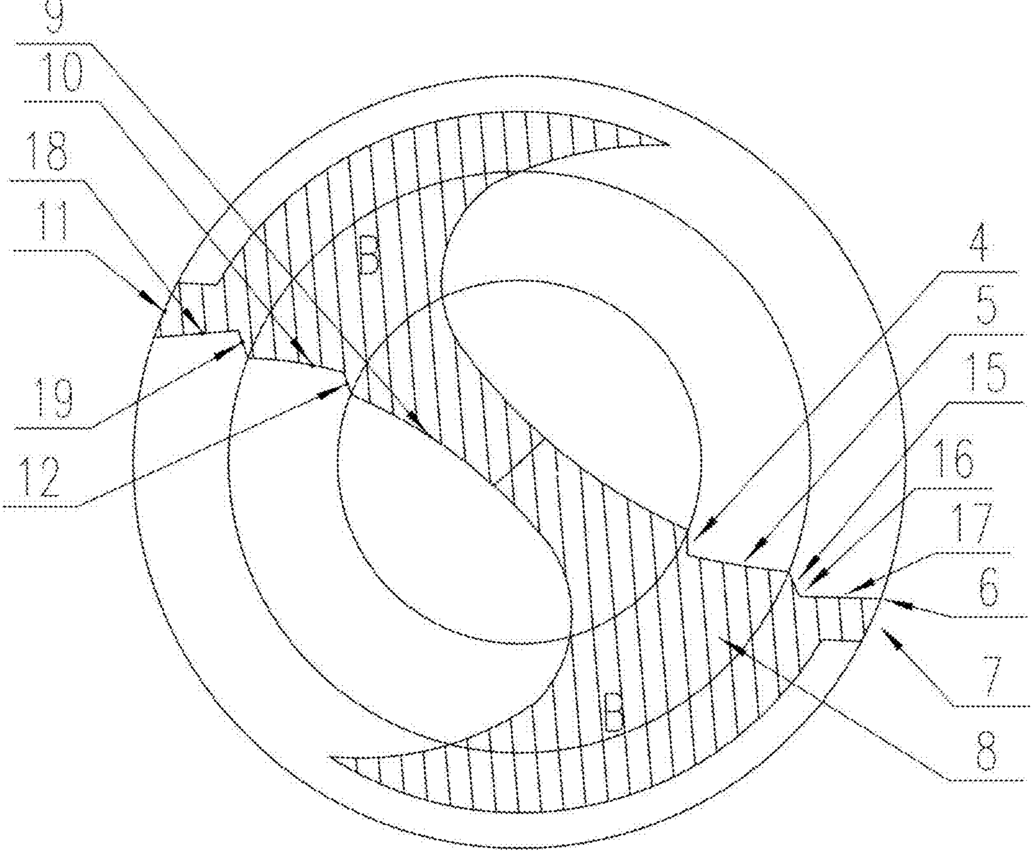
FIG. 4 is a schematic diagram of a top view section of a micro-reinforced concentric twist drill according to the third and seventh embodiments of the present disclosure.

A micro-reinforced concentric twist drill according to a third embodiment of the present disclosure is as shown in FIGS. 4-5, which is comprehensively applied on the basis of the first embodiment and the second embodiment, and mainly relates to a drilling tool for machining. The micro-reinforced concentric twist drill includes a tool shank (not shown) and a tool head. At least two spiral strips B are integrally formed on the tool head. A surface, facing a cutting direction, of each spiral strip B is formed as a spiral cutting surface 3, a surface extending backward along an outer edge of the spiral cutting surface 5 is formed as a spiral pair cutting surface 5, the spiral cutting surface 3 intersects with the spiral pair cutting surface 5 to form a spiral cutting edge 6, and a surface on a back side of an axial front end of the spiral cutting surface 3 is formed as a rear cutting surface 8. At least the rear cutting surfaces on both sides intersect to form a chisel edge A, the spiral cutting surface 3 intersects with the rear cutting surface 8 to form a cutting edge 11, and the spiral pair cutting surface 5 intersects with the rear cutting surface 8 to form a side edge 10.

The present disclosure relates to the arrangement of a symmetric concentric drill technology and a micro-reinforcement technology of sharp high-strength spiral cutting edges on a common twist drill.

On both sides of the micro-reinforced concentric twist drill, protruding micro-reinforced reamers 4 are symmetrically arranged at center areas of the spiral cutting surfaces 3 spirally extending along the direction towards the axial center O. A reaming cutting surface 11 protrudes from an inner side of each micro-reinforced reamer 4, and the reaming cutting surface 11 extends forward to intersect with the rear cutting surface 8 to form a reaming cutting edge 9.

On both sides of the micro-reinforced concentric twist drill, micro-reinforced wear-resistant grooves 16 recessed along the direction from the spiral cutting edges 6 inward to the axial center O are integrally formed on the spiral cutting surfaces 3. A micro-reinforced wear-resistant cutting surface 17 with millimeter strength is formed at a bottom of each micro-reinforced wear-resistant groove 16 along the spiral cutting edge 6, and a protruding micro-reinforced wear-resistant table 15 is arranged on an inner side of the micro-reinforced wear-resistant cutting surface 17. The micro-reinforced wear-resistant cutting surface 17 extends forward to intersect with the rear cutting surface 8 to form a micro-reinforced wear-resistant cutting edge 18.

The protruding micro-reinforced concentric reamers and the protruding concentric reaming cutting surfaces are symmetrically arranged at the center areas of the spiral cutting surfaces along the direction towards the axial center of the micro-reinforced concentric twist drill.

Each concentric reaming cutting surface of the micro-reinforced concentric twist drill extends axially forward end along the spiral cutting surface to intersect with the rear cutting surface to form a reaming cutting edge.

A height from the micro-reinforced concentric reamer of the micro-reinforced concentric twist drill to the spiral cutting surface is less than or equal to one-tenth of a diameter of the micro-reinforced concentric twist drill.

The micro-reinforced reamers or the micro-reinforced concentric reamers have the effects of balancing and stabilizing.

The micro-reinforced concentric wear-resistant grooves recessed along the spiral cutting edge are symmetrically formed on the spiral cutting surfaces on both sides of the axial center of the micro-reinforced concentric twist drill.

A micro-reinforced concentric wear-resistant table and a micro-reinforced concentric wear-resistant cutting surface are arranged in the micro-reinforced concentric wear-resistant groove of the micro-reinforced concentric twist drill.

An included angle between the micro-reinforced wear-resistant cutting surface of the micro-reinforced concentric twist drill and the spiral pair cutting surface is less than or equal to an included angle between the spiral cutting surface and the spiral pair cutting surface.

An included angle between the micro-reinforced wear-resistant cutting surface of the micro-reinforced concentric twist drill and the spiral pair cutting surface is less than an included angle between the spiral cutting surface and the spiral pair cutting surface.

An included angle between the micro-reinforced concentric wear-resistant cutting surface of the micro-reinforced concentric twist drill and the spiral pair cutting surface is equal to an included angle between the spiral cutting surface and the spiral pair cutting surface.

The micro-reinforced concentric wear-resistant cutting surface of the micro-reinforced concentric twist drill extends to the axial front end along the spiral cutting surface to intersect with the rear cutting surface to form a micro-reinforced concentric wear-resistant cutting edge.

The micro-reinforced wear-resistant grooves or the micro-reinforced concentric wear-resistant grooves have the effect of prolonging the service life.

The micro-reinforced wear-resistant cutting surfaces are symmetrically arranged on the spiral cutting surfaces on both sides of the axial center of the micro-reinforced concentric twist drill.

A height of the micro-reinforced concentric wear-resistant table of the micro-reinforced concentric twist drill is less than or equal to 1 mm.

A width of the micro-reinforced wear-resistant cutting surface of the micro-reinforced concentric twist drill is less than or equal to one-sixth of the diameter of the micro-reinforced concentric twist drill.

As the included angle $\alpha 2$ between the micro-reinforced wear-resistant cutting surface 17 of the micro-reinforced concentric twist drill and the spiral pair cutting surface 5 is less than an included angle $\alpha 1$ between the spiral cutting surface 3 and the spiral pair cutting surface 5, the micro-reinforced concentric twist drill provided with the micro-reinforced wear-resistant grooves 16 or the micro-reinforced concentric wear-resistant grooves 16 has small resistance and high cutting efficiency.

As the symmetrical micro-reinforced center drills 2 and the micro-reinforced central cutting surface 1 protruding from the inner side are arranged on the spiral cutting surfaces 3 on both sides of the axial center, and a micro-reinforced wear-resistant table 15 and a micro-reinforced wear-resistant cutting surface 17 are arranged in a micro-reinforced wear-resistant groove 16, the stability of the micro-reinforced concentric twist drill is effectively maintained, and the wear of the cutting edges of the micro-reinforced concentric twist drill is reduced, which is beneficial to continuously maintain the sharpness of the cutting edges of the tool and improve the cutting efficiency.

The rear cutting surfaces on both sides of the micro-reinforced concentric twist drill intersect to form a chisel edge A, or chamfered surfaces (not shown), and chamfered edge (not shown) are formed by chamfering both ends of the chisel edge A, an original chisel edge A is chamfered to form a reduced chisel edge A or a sharp edge (not shown) without chisel edge A, and the reduction or elimination of the chisel edge A greatly reduces the huge resistance caused by the excessively long chisel edge.

According to the above structure, because drilling and cutting are carried out in a circular movement, a centrifugal force is generated during the process of circular movement, which causes the rapid wear of the spiral cutting edge 6, and the force on the micro-reinforced wear-resistant table 15 and the micro-reinforced wear-resistant cutting surface 17 in the micro-reinforced wear-resistant groove 16 is transferred to the inner spiral cutting edge and the spiral cutting surface. Meanwhile, the micro-reinforced wear-resistant cutting surface 17 extends forward to intersect with the rear cutting surface to form a micro-reinforced wear-resistant cutting edge 18, which has the effects of high strength and wear-resistant, so as to maintain the cutting edge sharp continuously, reduce the overall cutting resistance, low the temperature of the tool head 1, decompose the force applied on the cutting edges at the most easily damaged outer end of the tool, prolong the service life of the tool and maintain high strength throughout the machining.

In the contrast experiment carried out on a drilling machine, a micro-reinforced concentric twist drill with a diameter of 10.5 mm was used for the experiment, which was also made of M35 cobalt-containing high-speed steel, heat treated and produced in the same batch. A drilling object is a forged and tempered gear finish turning workpiece, a drilling depth is 35 mm, and blind holes are formed. A width of a spiral micro-cutting surface 7 of the micro-reinforced concentric twist drill is 1.5 mm, and a height of a micro-reinforced wear-resistant table is 0.6 mm. In the case that the rotating speed and the feed amount of the micro-reinforced concentric twist drill with a common structure reach the limit, the rotating speed of the micro-reinforced concentric twist drill can be increased by 40%, the feed amount is increased by 40%, and the comprehensive drilling efficiency is increased by 0.96 times. 312 holes can be drilled by the micro-reinforced concentric twist drill with a common structure, and 5308 holes can be drilled by the micro-reinforced concentric twist drill according to the embodiment of the present disclosure. The number of holes drilled by the micro-reinforced concentric twist drill according to the embodiment of the present disclosure is sixteen times more than that drilled by the micro-reinforced concentric twist drill with a common structure.

Fourth Embodiment

A micro-reinforced concentric twist drill according to a fourth embodiment of the present disclosure is as shown in FIGS. 1-5, which is comprehensively applied on the basis of the first embodiment to the third embodiment, and mainly relates to a drilling tool for machining. The micro-reinforced concentric twist drill includes a tool shank (not shown) and a tool head. At least two spiral strips B are integrally formed on the tool head. A surface, facing a cutting direction, of each spiral strip B is formed as a spiral cutting surface 3, a surface extending backward along an outer edge of the spiral cutting surface 3 is formed as a spiral pair cutting surface 5, the spiral cutting surface 3 intersects with the spiral pair cutting surface 5 to form a spiral cutting edge 6, and a surface on a back side of an axial front end of the spiral cutting surface 3 is formed as a rear cutting surface 8. At least the rear cutting surfaces on both sides intersect to form a chisel edge A, the spiral cutting surface 3 intersects with the rear cutting surface 8 to form a cutting edge 11, and the spiral pair cutting surface 5 intersects with the rear cutting surface 8 to form a side edge 10.

The present disclosure relates to the arrangement of a symmetric concentric drill technology and a micro-reinforcement technology of sharp high-strength spiral cutting edges on a common twist drill.

Protruding micro-reinforced center drills 2 are symmetrically arranged on the spiral cutting surfaces 3 on both sides of a region of an axial center O of the micro-reinforced concentric twist drill, and each micro-reinforced center drill 2 protrudes from the region of the axial center of the micro-reinforced concentric twist drill to form a protruding side edge of the center drilling tool 13. A micro-reinforced central cutting surface 1 in millimeters protrudes from an inner side of each micro-reinforced center drill, and each micro-reinforced central cutting surface 1 extends axially forward to intersect with the rear cutting surface to form a micro-reinforced center hole drilling edge 14 of the micro-reinforced concentric twist drill.

On both sides of the micro-reinforced concentric twist drill, protruding micro-reinforced reamers 4 are integrally and symmetrically arranged at center areas of the spiral cutting surfaces 3 spirally extending along the direction towards the axial center O. A reaming cutting surface 11 protrudes from an inner side of each micro-reinforced reamer 12, and the reaming cutting surface 11 extends forward to intersect with the rear cutting surface 8 to form a reaming cutting edge 9.

On both sides of the micro-reinforced concentric twist drill, micro-reinforced wear-resistant grooves 16 recessed along the direction from the spiral cutting edges 6 inward to the axial center O are integrally formed on the spiral cutting surfaces 3. A micro-reinforced wear-resistant cutting surface 17 with millimeter strength is formed at a bottom of each micro-reinforced wear-resistant groove 16 along the spiral cutting edge 6, and a protruding micro-reinforced wear-resistant table 15 is arranged on an inner side of the micro-reinforced wear-resistant cutting surface 17. The micro-reinforced wear-resistant cutting surface 17 extends forward to intersect with the rear cutting surface 8 to form a micro-reinforced wear-resistant cutting edge 18.

As an included angle $\alpha 2$ between a micro-reinforced wear-resistant cutting surface 17 of the micro-reinforced concentric twist drill and the spiral pair cutting surface 5 is less than an included angle $\alpha 1$ between the spiral cutting surface 3 and the spiral pair cutting surface 5, the micro-reinforced concentric twist drill provided with the micro-reinforced wear-resistant grooves 16 or the micro-reinforced concentric wear-resistant grooves 16 has small resistance and higher cutting efficiency.

As the symmetrical micro-reinforced center drills 2 and the micro-reinforced central cutting surfaces 1 protruding from the inner side are arranged on the spiral cutting surfaces 3 on both sides of the axial center, and a micro-reinforced wear-resistant table 15 and a micro-reinforced wear-resistant cutting surface 17 are arranged in a micro-reinforced wear-resistant groove 16, the stability of the micro-reinforced concentric twist drill is effectively maintained, and the wear of the cutting edges of the micro-reinforced concentric twist drill is reduced, which is beneficial to continuously maintain the sharpness of the cutting edges of the tool and improve the cutting efficiency.

In the contrast experiment carried out on a drilling machine, a micro-reinforced concentric twist drill with a diameter of 10.5 mm was used for the experiment, which is also made of M35 cobalt-containing high-speed steel, heat treated and produced in the same batch. A drilling object is a forged and tempered gear finish turning workpiece, a drilling depth is 35 mm, and blind holes are formed. A width of a spiral branch hole cutting surface 3 of the micro-reinforced concentric twist drill is 2.5 mm, and a height of a spiral branch hole table 12 is 0.8 mm. In the case that the rotating speed and the feed amount of the micro-reinforced concentric twist drill with a common structure reach the limit, the rotating speed of the micro-reinforced concentric twist drill can be increased by 40%, the feed amount is increased by 40%, and the comprehensive drilling efficiency is increased by 0.96 times. 312 holes can be drilled by the micro-reinforced concentric twist drill with a common structure, and 3376 holes can be drilled by the micro-reinforced concentric twist drill according to the embodiment of the present disclosure. The number of holes drilled by the micro-reinforced concentric twist drill according to the embodiment of the present disclosure is ten times more than that drilled by the micro-reinforced concentric twist drill with a common structure.

On the basis of the first embodiment to the fourth embodiment, a comprehensive and selective application is conducted. The rear cutting surfaces on both sides intersect to form a chisel edge A, a chambered surface and a chamfered edge are formed by chamfering on both ends, an original chisel edge A is chamfered to form a reduced chisel edge A or a sharp edge A without chisel edge A, and the reduction or elimination of the chisel edge A greatly reduces huge resistance caused by the excessively long chisel edge.

Fifth Embodiment

A micro-reinforced concentric twist drill according to a fifth embodiment of the present disclosure is as shown in FIGS. 1, 2 and 5. The micro-reinforced concentric twist drill according to a fifth embodiment of the present disclosure relates to a drilling tool for machining. The micro-reinforced concentric twist drill includes a tool shank (not shown) and a tool head. At least two spiral strips B are integrally formed on the tool head. A surface, facing a cutting direction, of each spiral strip B is formed as a spiral cutting surface 3, a surface extending backward along an outer edge of the spiral cutting surface 3 is formed as a spiral pair cutting surface 5, the spiral cutting surface 3 intersects with the spiral pair cutting surface 5 to form a spiral cutting edge 6, and a surface on a back side of an axial front end of the spiral cutting surface 3 is formed as a rear cutting surface 8. At least the rear cutting surfaces on both sides intersect to form a chisel edge A, the spiral cutting surface 3 intersects with the rear cutting surface 8 to form a cutting edge 11, and the spiral pair cutting surface 5 intersects with the rear cutting surface 8 to form a side edge 10.

The present disclosure relates to the arrangement of a symmetric concentric drill technology and a micro-reinforcement technology on a common twist drill.

Protruding micro-reinforced center drills 2 are symmetrically arranged on the spiral cutting surfaces 3 on both sides of a region of an axial center O of the micro-reinforced concentric twist drill, and each micro-reinforced center drill 2 protrudes from the region of the axial center of the micro-reinforced concentric twist drill to form a protruding center drilling tool. A micro-reinforced central cutting surface 1 in millimeters protrudes from an inner side of each micro-reinforced center drill, and each micro-reinforced central cutting surface 1 extends axially forward to intersect with the rear cutting surface to form a micro-reinforced center hole drilling edge 14 of the micro-reinforced concentric twist drill.

The micro-reinforced concentric center drills 2 and the micro-reinforced concentric central cutting surfaces 1 are symmetrically arranged on the spiral cutting surfaces 3 of both sides of the axial center of the micro-reinforced concentric twist drill, respectively.

Each micro-reinforced concentric central cutting surface 1 of the micro-reinforced concentric twist drill extends to the axial front end along the spiral cutting surface to intersect with the rear cutting surface 8 to form a center hole drilling edge 14.

The micro-reinforced concentric twist drill protrudes from a region of the axial center thereof to form a protruding center drilling tool.

A height from the micro-reinforced concentric center cutting surface 1 of the micro-reinforced center drill of the micro-reinforced concentric twist to the spiral cutting surface 3 is less than or equal to one-tenth of a diameter of the micro-reinforced concentric twist drill.

The micro-reinforced center drills 2 or the micro-reinforced concentric drills 2 have the effects of reducing the resistance and increasing the efficiency.

Each concentric reaming cutting surface 11 of the micro-reinforced concentric twist drill extends axially forward end along the spiral cutting surface 3 to intersect with the rear cutting surface 8 to form a reaming cutting edge 9.

As the micro-reinforced center drills 2 and the micro-reinforced central cutting surfaces 1 protruding from the inner side are symmetrically arranged on the spiral cutting surfaces 3 on both sides of the axial center, and a micro-reinforced wear-resistant table 15 and a micro-reinforced wear-resistant cutting surface 17 are formed in a micro-reinforced wear-resistant groove 16, the stability of the micro-reinforced concentric twist drill is effectively maintained, and the wear of the cutting edge of the micro-reinforced concentric twist drill is reduced, which is beneficial to continuously maintain the sharpness of the cutting edges of the tool and increase the cutting efficiency.

Sixth Embodiment

Figure 3:
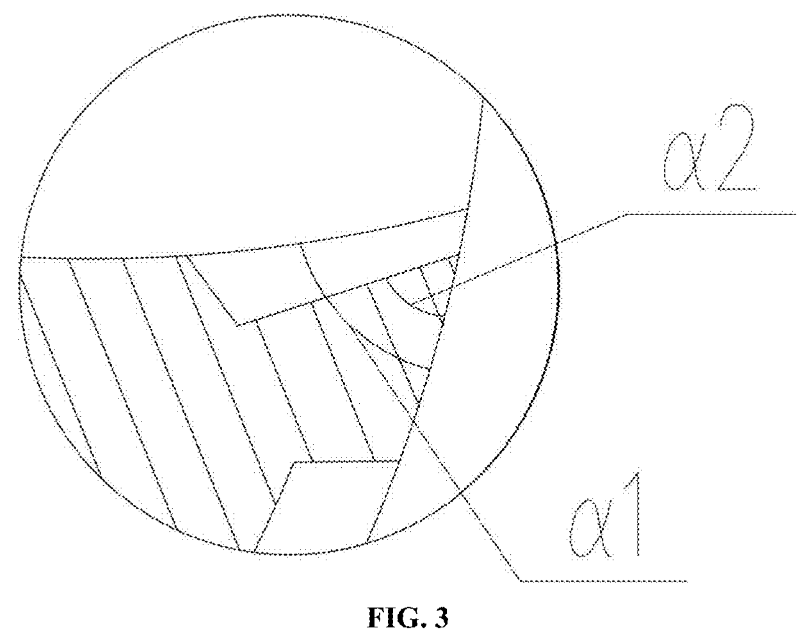
FIG. 3 is schematic diagram of a partial structure of a micro-reinforced concentric twist drill according to the sixth embodiments of the present disclosure.

A micro-reinforced concentric twist drill according to a sixth embodiment of the present disclosure is as shown in FIGS. 1, 3 and 5, relating to a drilling tool for machining. The micro-reinforced concentric twist drill includes a tool shank (not shown) and a tool head. At least two spiral strips B are integrally formed on the tool head . A surface, facing a cutting direction, of each spiral strip B is formed as a spiral cutting surface 3, a surface extending backward along an outer edge of the spiral cutting surface 3 is formed as a spiral pair cutting surface 5, the spiral cutting surface 3 intersects with the spiral pair cutting surface 5 to form a spiral cutting edge 6, and a surface on a back side of an axial front end of the spiral cutting surface 5 is formed as a rear cutting surface 8. At least the rear cutting surfaces both sides intersect to form a chisel edge A, the spiral cutting surface 3 intersects with the rear cutting surface 8 to form a cutting edge 11, and the spiral pair cutting surface 5 intersects with the rear cutting surface 8 to form a side edge 11.

The present disclosure relates to the application of a symmetric concentric drill technology and a micro-reinforcement technology on a common twist drill.

On both sides of the micro-reinforced concentric twist drill, protruding micro-reinforced reamers 4 are integrally and symmetrically arranged at center areas of the spiral cutting surfaces 3 spirally extending along the direction towards the axial center O. A protruding reaming cutting surface 11 is protrudes from an inner side of each micro-reinforced reamer 4, and the reaming cutting surface 11 extends forward to intersect with the rear cutting surface 8 to form a reaming cutting edge 9.

The micro-reinforced concentric twist drill protrudes from a region of an axial center of the micro-reinforced concentric twist drill to form a protruding center drilling tool.

The protruding micro-reinforced concentric reamer 4 and the protruding concentric reaming cutting surfaces 11 are symmetrically arranged at the center areas of the spiral cutting surfaces 3 along the direction towards the axial center of the micro-reinforced concentric twist drill.

Each concentric reaming cutting surface 11 of the micro-reinforced concentric twist drill extends axially forward end along the spiral cutting surface 3 to intersect with the rear cutting surface 8 to form a reaming cutting edge 9.

A height from the micro-reinforced reamer 4 of the micro-reinforced concentric twist drill to the spiral cutting surface is less than or equal to one-tenth of the diameter of the micro-reinforced concentric twist drill.

The micro-reinforced reamer or the micro-reinforced concentric reamers 4 have the effects of balancing and stabilizing.

As the symmetrical micro-reinforced center drills 2 and the micro-reinforced central cutting surfaces 1 protruding from the inner side are symmetrically arranged on the spiral cutting surfaces 3 on both sides of axial center, and a micro-reinforced wear-resistant table 15 and a micro-reinforced wear-resistant cutting surface 17 are formed in a micro-reinforced wear-resistant groove 16, the stability of the micro-reinforced concentric twist drill is effectively maintained, and the wear of the cutting edges of the micro-reinforced concentric twist drill is reduced, which is beneficial to continuously maintain the sharpness of the cutting edges of the tool and increase the cutting efficiency.

Seventh Embodiment

A micro-reinforced concentric twist drill according to a seventh embodiment of the present disclosure is shown in FIGS. 2, 4 and 5, which is comprehensively applied on the basis of the first embodiment, and mainly relates to a drilling tool for machining. The micro-reinforced concentric twist drill includes a tool shank (not shown) and a tool head. At least two spiral strips B are integrally formed on the tool head. A surface, facing a cutting direction, of each spiral strip B is formed as a spiral cutting surface 3, a surface extending backward along an outer edge of the spiral cutting surface 3 is formed as a spiral pair cutting surface 5, the spiral cutting surface 3 intersects with the spiral pair cutting surface 5 to form a spiral cutting edge 6, and a surface on a back side of an axial front end of the spiral cutting surface 3 is formed as a rear cutting surface 8. At least the rear cutting surfaces on both sides intersect to form a chisel edge A, the spiral cutting surface 3 cut with the rear cutting surface 8 to form a cutting edge 11, and the spiral pair cutting surface 5 intersects with the rear cutting surface 8 to form a side edge 10.

The present disclosure relates to the arrangement of a symmetric concentric drill technology and a micro-reinforcement technology of sharp high-strength spiral cutting edges on a common twist drill.

On both sides of the micro-reinforced concentric twist drill, micro-reinforced wear-resistant grooves 16 recessed along the direction from the spiral cutting edges 6 inward to the axial center O are integrally formed on the spiral cutting surfaces 3. A micro-reinforced wear-resistant cutting surface 17 with millimeter strength is formed at a bottom of each micro-reinforced wear-resistant groove 16 along the spiral cutting edge 6, and a protruding micro-reinforced wear-resistant table 15 is arranged on an inner side of the micro-reinforced wear-resistant cutting surface 17. The micro-reinforced wear-resistant cutting surface 17 extends forward to intersect with the rear cutting surface 8 to form a micro-reinforced wear-resistant cutting edge 18.

The micro-reinforced concentric wear-resistant grooves 16 recessed along the spiral cutting edge 6 are symmetrically formed on the spiral cutting surfaces 3 on both sides of the axial center of the micro-reinforced concentric twist drill.

A micro-reinforced concentric wear-resistant table 15 and a micro-reinforced wear-resistant concentric cutting surface 17 are arranged in the micro-reinforced concentric wear-resistant groove 16 of the micro-reinforced concentric twist drill.

An included angle α2 between the micro-reinforced wear-resistant cutting surface 17 of the micro-reinforced concentric twist drill and the spiral pair cutting surface 5 is equal to an included angle α1 between the spiral cutting surface 3 and the spiral pair cutting surface 5.

An included angle α2 between the micro-reinforced wear-resistant cutting surface 17 of the micro-reinforced concentric twist drill and the spiral pair cutting surface 5 is less than an included angle α1 between the spiral cutting surface 3 and the spiral pair cutting surface 5.

The micro-reinforced concentric wear-resistant cutting surface 17 of the micro-reinforced concentric twist drill extends axially forward end along the spiral cutting surface 3 to intersect with the rear cutting surface 8 to form a micro-reinforced concentric wear-resistant cutting edge 18.

The micro-reinforced wear-resistant grooves 16 or the micro-reinforced concentric wear-resistant grooves 16 have the effect of prolonging the service life.

The micro-reinforced wear-resistant cutting surfaces 17 are symmetrically arranged on the spiral cutting surfaces 3 on both sides of the axial center of the micro-reinforced concentric twist drill.

A height of the micro-reinforced concentric wear-resistant table 15 of the micro-reinforced concentric twist drill is less than or equal to 1 mm.

A width of the micro-reinforced wear-resistant cutting surface 17 of the micro-reinforced concentric twist drill is less than or equal to one-sixth of the diameter of the micro-reinforced concentric twist drill.

Through the above arrangement, a process hole is formed first and then drilled during the drilling process. As the arrangement on the same tool has high stability, compared with the common reamers, the micro-reinforced concentric twist drill has the advantages of high stability, high efficiency and higher drilling accuracy.

As the included angle α2 between the micro-reinforced wear-resistant cutting surface 17 of the micro-reinforced concentric twist drill and the spiral pair cutting surface 5 is less than an included angle $\alpha 1$ between the spiral cutting surface 3 and the spiral pair cutting surface 5, the micro-reinforced concentric twist drill provided with the micro-reinforced wear-resistant grooves 16 or the micro-reinforced concentric wear-resistant grooves 16 has small resistance and high cutting efficiency.

Although the tool with two spiral strips B has been described above as an example, the tool of the present disclosure may also have multiple spiral strips B, and the structure as described in the embodiments and other various combinations thereof may be adopted on each spiral strip B.

The preferred embodiments described above are illustrative and not restrictive. The present disclosure may be implemented and embodied in other ways without departing from the spirit and essential characteristics of the present disclosure, the scope of which is defined by the claims. All variations falling within the scope of the claims are intended to fall within the scope of the present disclosure.

What is claimed is:

1. A micro-reinforced concentric twist drill, comprising a tool shank, and a tool head, wherein at least two spiral strips are formed on the tool head, for each respective spiral strip, a surface, facing a cutting direction, of the respective spiral strip is formed as a spiral cutting surface, a surface extending backwards along an outer edge of the spiral cutting surface is formed as a spiral pair cutting surface, the spiral cutting surface intersects with the spiral pair cutting surface to form a spiral cutting edge, and a surface on a back side of an axial front end of the respective spiral strip is formed as a rear cutting surface; rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge;

wherein, on both sides of a region of an axial center of the micro-reinforced concentric twist drill, protruding micro-reinforced center drills are symmetrically arranged on the spiral cutting surfaces, and each micro-reinforced center drill extends to the rear cutting surface and protrudes to form a center drilling tool; a micro-reinforced central cutting surface protrudes from an inner side of each micro-reinforced center drill, and each micro-reinforced central cutting surface extends axially forward to intersect with the rear cutting surface to form a micro-reinforced center hole drilling edge of the micro-reinforced concentric twist drill;

on both sides of the axial center, protruding micro-reinforced reamers are integrally and symmetrically arranged at center areas of the spiral cutting surfaces; a reaming cutting surface protrudes from an inner side of each micro-reinforced reamer, and each reaming cutting surface extends forward to intersect with the rear cutting surface to form a reaming cutting edge; and on both sides of the micro-reinforced concentric twist drill, protruding micro-reinforced reamers are symmetrically arranged at center areas of the spiral cutting surfaces spirally extending along the direction towards an axial center; a reaming cutting surface protrudes from an inner side of each micro-reinforced reamer, and each reaming cutting surface extends forward to intersect with the rear cutting surface to form a reaming cutting edge.

2. The micro-reinforced concentric twist drill according to claim 1, wherein the rear cutting surfaces on both sides of the micro-reinforced concentric twist drill intersect at the axial center to form the chisel edge, and a chamfered surface and a shortened chisel edge are formed on both sides of the chisel edge of the micro-reinforced concentric twist drill by chamfering; or a chamfered surface and a sharp edge are formed on both sides of the chisel edge of the micro-reinforced concentric twist drill.

3. The micro-reinforced concentric twist drill according to of claim 1, wherein cooling holes are formed in the spiral strips of the tool shank and the tool head of the micro-reinforced concentric twist drill.

4. The micro-reinforced concentric twist drill according to claim 1, wherein one or more steps from a central chisel edge are formed on the micro-reinforced concentric twist drill by a gradual reduction in height on the rear cutting surface in a direction of an outer side edge; or one or more notch edges are formed on the cutting edge of the micro-reinforced concentric twist drill, and the one or more notch edges extend to the rear cutting surface to form one or more grooves.

5. A micro-reinforced concentric twist drill, comprising a tool shank, and a tool head, wherein at least two spiral strips are integrally formed on the tool head, for each respective spiral strip, a surface, facing a cutting direction, of the respective spiral strip is formed as a spiral cutting surface, a surface extending backward along an outer edge of the spiral cutting surface is formed as a spiral pair cutting surface, the spiral cutting surface intersects with the spiral pair cutting surface to form a spiral cutting edge, and a surface on a back side of an axial front end of the respective spiral strip is formed as a rear cutting surface; rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge;

wherein, on both sides of a region of an axial center of the micro-reinforced concentric twist drill, protruding micro-reinforced center drills are symmetrically arranged on the spiral cutting surfaces, and each micro-reinforced center drill extends to the rear cutting surface and protrudes to form a center drilling tool; a micro-reinforced central cutting surfaces in-millimeter-sprotrudes from an inner side of the micro-reinforced center drill, and each micro-reinforced central cutting surface extends axially forward to intersect with the rear cutting surface to form a micro-reinforced center hole drilling edge of the micro-reinforced concentric twist drill; and on both sides of the micro-reinforced concentric twist drill, micro-reinforced wear-resistant grooves recessed along a direction from the spiral cutting edges inward to the axial center are integrally formed on the spiral cutting surfaces; a micro-reinforced wear-resistant cutting surface is formed at a bottom of each micro-reinforced wear-resistant groove along the spiral cutting edge, and a protruding micro-reinforced wear-resistant table is arranged on an inner side of the micro-reinforced wear-resistant cutting surface; and each micro-reinforced wear-resistant cutting surface extends forward to intersect with the rear cutting surface to form a micro-reinforced wear-resistant cutting edge.

6. The micro-reinforced concentric twist drill according to claim 5, wherein an included angle between the micro-reinforced wear-resistant cutting surface and the spiral pair cutting surface is less than an included angle between the spiral cutting surface and the spiral pair cutting surface; or an included angle between the micro-reinforced wear-resistant cutting surface and the spiral pair cutting surface is equal to an included angle between the spiral cutting surface and the spiral pair cutting surface.

7. The micro-reinforced concentric twist drill according to claim 5, wherein a chamfered surface and a shortened chisel edge are formed on both sides of the chisel edge of the micro-reinforced concentric twist drill by chamfering; or a chamfered surface and a sharp edge are formed on both sides of the chisel edge of the micro-reinforced concentric twist drill.

8. The micro-reinforced concentric twist drill according to claim 5, wherein cooling holes are formed in the spiral strips of the tool shank and the tool head of the micro-reinforced concentric twist drill.

9. The micro-reinforced concentric twist drill according to claim 5, wherein one or more steps from a central chisel edge are formed on the micro-reinforced concentric twist drill by a gradual reduction in height on the rear cutting surface in a direction of RD outer side edge; or one or more notch edges are formed on the cutting edge of the micro-reinforced concentric twist drill, and the one or more notch edges extend to the rear cutting surface to form one or more grooves.

10. A micro-reinforced concentric twist drill, comprising a tool shank, and a tool head, wherein at least two spiral strips B are integrally formed on the tool head, for each respective spiral strip, a surface, facing a cutting direction, of respective spiral strip is formed as a spiral cutting surface, a surface extending backward along an outer edge of the spiral cutting surface is formed asa spiral pair cutting surface, the spiral cutting surface intersects with the spiral pair cutting surface to form a spiral cutting edge, and a surface on a top side of an axial front end of the respective spiral strip is formed as a rear cutting surface; rear cutting surfaces on both sides intersect to form a chisel edge, and for each spiral strip, the spiral cutting surface intersects with the rear cutting surface to form a cutting edge, and the spiral pair cutting surface intersects with the rear cutting surface to form a side edge;

wherein, on both sides of the micro-reinforced concentric twist drill, protruding micro-reinforced reamers are symmetrically arranged at center areas of the spiral cutting surfaces spirally extending along the direction towards an axial center; a reaming cutting surface protrudes from an inner side of each micro-reinforced reamer, and each reaming cutting surface extends forward to intersect with the rear cutting surface to form a reaming cutting edge;

micro-reinforced wear-resistant grooves recessed along a direction from the spiral cutting edges inward to the axial center are integrally formed on the spiral cutting surfaces; a micro-reinforced wear-resistant cutting surface is formed at a bottom of each micro-reinforced wear-resistant groove along each spiral cutting edge, and a protruding micro-reinforced wear-resistant table is arranged on an inner side of the micro-reinforced wear-resistant cutting surface; each micro-reinforced wear-resistant table extends forward to intersect with the rear cutting surface to form a micro-reinforced wear-resistant drill, and each micro-reinforced wear-resistant cutting surface extends forward to intersect with the rear cutting surface to form a micro-reinforced wear-resistant cutting edge.

11. The micro-reinforced concentric twist drill according to claim 10, wherein an included angle between the micro-reinforced wear-resistant cutting surface and the spiral pair cutting surface is less than an included angle between the spiral cutting surface and the spiral pair cutting surface; or an included angle between the micro-reinforced wear-resistant cutting surface and the spiral pair cutting surface is equal to an included angle between the spiral cutting surface and the spiral pair cutting surface.

12. The micro-reinforced concentric twist drill according to claim 10, wherein the rear cutting surfaces on both sides of the micro-reinforced concentric twist drill intersect at the axial center to form a chisel edge, and a chamfered surface and a shortened chisel edge are formed on both sides of the chisel edge of the micro-reinforced concentric twist drill by chamfering; or a chamfered surface and a sharp edge without a chisel edge are formed on both sides of the chisel edge of the micro-reinforced concentric twist drill.

13. The micro-reinforced concentric twist drill according to claim 10, wherein cooling holes are formed in the spiral strips of the tool shank and the tool head of the micro-reinforced concentric twist drill.

14. The micro-reinforced concentric twist drill according to claim 10, wherein one or more steps from a central chisel edge are formed on the micro-reinforced concentric twist drill by a gradual reduction in height on the rear cutting surface in a direction of an outer side edge; or one or more notch edges are formed on the cutting edge of the micro-reinforced concentric twist drill, and the one or more notch edges extend to the rear cutting surface to form one or more grooves.

* * * * *